United States Patent
Hwang

(10) Patent No.: US 6,566,463 B1
(45) Date of Patent: May 20, 2003

(54) MULTIFUNCTIONAL METALLIC COAGENTS

(75) Inventor: In Hong Hwang, Kyonggi-Do (KR)

(73) Assignee: Saeng-Ki Lim (KR)

( * ) Notice: Subject to any disclaimer, the term of this patent is extended or adjusted under 35 U.S.C. 154(b) by 0 days.

(21) Appl. No.: 09/991,724

(22) Filed: Nov. 14, 2001

(30) Foreign Application Priority Data

Oct. 23, 2001 (KR) .................................... 2001-0065244

(51) Int. Cl.$^7$ ................................................ C08J 20/06
(52) U.S. Cl. .............................. 526/124.2; 526/318.2; 526/113; 526/123.1; 526/160; 525/372; 525/386; 525/363; 525/268
(58) Field of Search .......................... 526/124.2, 318.2, 526/113, 123.1, 160; 525/372, 386, 363, 268

(56) References Cited

U.S. PATENT DOCUMENTS 6,444,771 B1 * 9/2002 Yamaguchi et al. ..... 526/317.1

* cited by examiner

Primary Examiner—James J. Seidleck
Assistant Examiner—Olga Asinovsky
(74) Attorney, Agent, or Firm—Amster, Rothstein & Ebenstein

(57) ABSTRACT

This invention provides the multifunctional coagents of the metallic salt of unsaturated carboxylic acid that obtained by the reaction from two mols of mono-basic acid and two mols of di-basic acid as an unsaturated carboxylic acid, and three mols of divalent metal oxide. For making these multifunctional coagents of metallic salt of unsaturated carboxylic acid, one kind or two kinds of mono-basic acid can be used among acrylic acid and methacrylic acid as an unsaturated carboxylic acid. As a di-basic acid, only one kind can be used among maleic acid and fumaric acid. And, as a metal complex for making this multifunctional metallic coagents, the divalent metal oxide such as zinc oxide, magnesium oxide and calcium oxide that can be used. One kind or two and over kinds of metal oxide can be used. This multifunctional metallic salts of unsaturated carboxylic acid crosslinking a rubber with an assistance of peroxide as an initiator in the process of react, that generates the crosslink bond in the formation of an ionic bond that giving a good heat stability and can slip along the hydrocarbon chain that having the superior tensile and tear strength to the cured rubber.

7 Claims, No Drawings

MULTIFUNCTIONAL METALLIC COAGENTS

FIELD OF THE INVENTION

The present invention relates to a multifunctional metallic coagent that improves the properties of a rubber by crosslinking with peroxide and vulcanizing the rubber.

BACKGROUND OF THE INVENTION

As a crosslinker, sulfur and sulfur complex which can be used the rubber curing stocks and the peroxide crosslinker for a long time, but the unsaturated carboxylic acid derivatives and its metallic salts are used the rubber vulcanizing agent in various field recently. Generally, crosslinking with peroxide results in the formation of a covalent bond, so the carbon-carbon bond is rigid and stable, but the cured rubber has the lower tensile and tear strength. And the good heat stability of this covalent bond explains the superior heat aged characteristics of peroxide crosslinking systems. In contrast, crosslinking with the sulfur and its derivatives are thermally weak but are mobile under stress and can slip along the hydrocarbon chain. This mobility explains the superior tensile and tear strength in the sulfur curing systems. Meanwhile, in case of the coagent of unsaturated carboxylic acid, there are so many crosslinkers to cure the rubber, the metallic salt of unsaturated carboxylic acid among them, which is crosslinking with peroxide as an initiator, the crosslink bond results in the formation of an ionic bond. This crosslink bond embodies the best characteristics of both peroxide and sulfur crosslinking systems, that showing a good heat stability and the ability to slip along the hydrocarbon chains giving the superior tensile and tear strength. The di-functional metallic coagent is employed as a metallic coagent of unsaturated carboxylic acid on the market that made from acrylic acid or methacrylic acid reacting with divalent metals such as zinc, calcium and magnesium. This di-functional metallic coagent of unsaturated carboxylic acid is a useful thing to improve the properties and curing the rubber, especially a core of golf ball in a field of elasticity. But, there is a difference between the properties of cured rubber depends on the kind of unsaturated carboxylic acid such as acrylic acid, methacrylic acid even in the metallic coagent of an unsaturated carboxylic acid. For an example, in case of the cured rubber using the metallic salt of acrylic acid that has a good elasticity, but has a defect in the strength of tensile and tear compared the cured rubber using the metallic salt of methacrylic acid. Using two kinds of metallic coagent revealed a good characteristic than using one kind of metallic coagent in some cases.

Moreover, in a shelf-life stability, there is no difference between the properties of metallic coagent of acrylic acid for a period of one year, but the metallic coagent of methacrylic acid should be used within six months for optimum product performance, after a lapse of six months, a falling-off occurred in the product performance. And, there are many difficulties to select a metallic coagent when crosslinking the rubber, because the properties are different depend on the used metal. Generally, there are many multifunctional coagents of unsaturated carboxylic acid in a phase of liquid except a crosslinker in a phase of metallic salt, that is difficult to mix with a rubber and hard to achieve a uniform performance of cured rubber due to a migration of liquid crosslinker in the mixture. In contrast, the metallic salt of unsaturated carboxylic acid in a form of powder, that is easy to get a uniform mixture when blending with a rubber and obtaining a good performance of cured rubber. Thereupon, this inventor made a new multifunctional metallic coagent of unsaturated carboxylic acid for crosslinking a rubber.

DETAILED DESCRIPTION OF THE INVENTION

The metallic coagents according to the present invention have a good characteristic which revealed using two kinds of metallic coagent in cured rubber as mentioned above, and to solve the problems in the mixture of common multifunctional crosslinker in a phase of liquid. The unsaturated carboxylic acids which can be used for a multifunctional metallic salt of unsaturated carboxylic acid in accordance with the present invention are mono-basic acid, such as acrylic acid, methacrylic acid and di-basic acid, such as maleic acid, fumaric acid. As a mono-basic acid, one kind of unsaturated carboxylic acid can be used among acrylic acid and methacrylic acid, or two kinds of unsaturated carboxylic acid can be used among them. And, as a di-basic acid, only one kind of unsaturated carboxylic acid can be used among maleic acid and fumaric acid. Meanwhile, as a metal complex for making a metallic salt of unsaturated carboxylic acid, divalent metal oxide, such as zinc oxide, calcium oxide and magnesium oxide can be used. One kind of metal oxide or two kinds of metal oxide can be used among them. For the reaction of metal oxide and unsaturated carboxylic acid according to the present invention, it must be react in organic solvent, such as toluene, ethanol, methanol and isopropanol that can be used alone or mixed. Basically, this invention is made by reaction from three mols of metal oxide with two mols of mono-basic acid and two mols of di-basic acid, being a multifunctional metallic salt of unsaturated carboxylic acid.

For an example, using two mols of acrylic acid as mono-basic acid, two mols of maleic acid as a di-basic acid and three mols of zinc oxid as a metal oxide, the reactants which eliminated the organic solvent and water due to the reaction that being stable state, trizincdimaleicacrylate is made in a form of white powder. This reaction is represented in the following reaction formula.

2 CH$_2$=CHCOOH + 2 HOOC—CH=CH—COOH +

3 ZnO $\longrightarrow$ 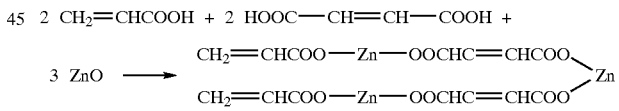

The crosslinking of generated trizincdimaleicacrylate with a rubber is as follows. Hereinafter, for the sake of convenience, cis-1,4 polybutadiene is described in the chemical reaction formula of this detail description as a rubber which expresses synthetic rubber, such as polybutadiene rubber, polyisoprene rubber, polystyrenebutadiene rubber, polyethylenebutadiene rubber, silicone rubber and etc. As mentioned above, to crosslink a rubber with organic peroxide as an initiator, reacting and crosslinking by heating in about 150~160° C. in a proper molding machine. This multifunctional metallic salt of unsaturated carboxylic acid crosslinking a rubber with an assistance of peroxide as an initiator in the process of react, generates the crosslink bond in the formation of an ionic bond that giving a good heat stability and the superior tensile and tear strength to the cured rubber. Meanwhile, this trizincdimaleicacrylate is represented in a formula as follows.

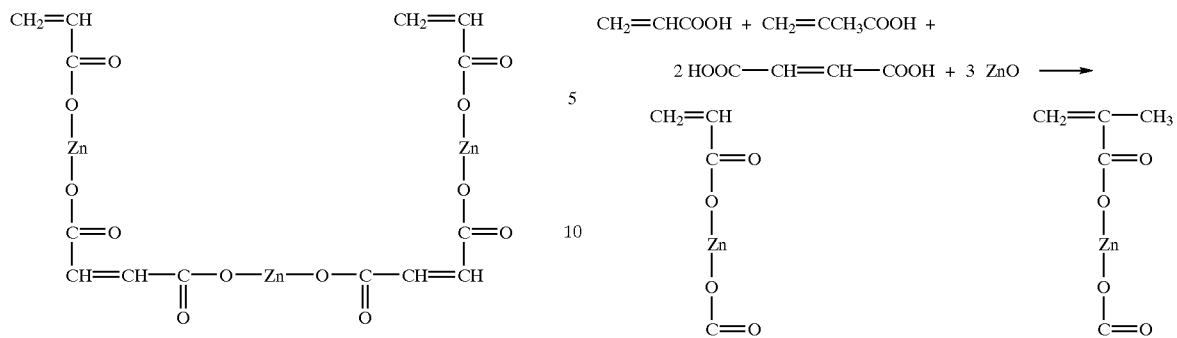

The crosslinking reaction of cis-1,4 polybutadiene and this multifunctional metallic coagent is represented in a formula as follows, the cured rubber having ionic bond which giving a superior tensile and tear strength.

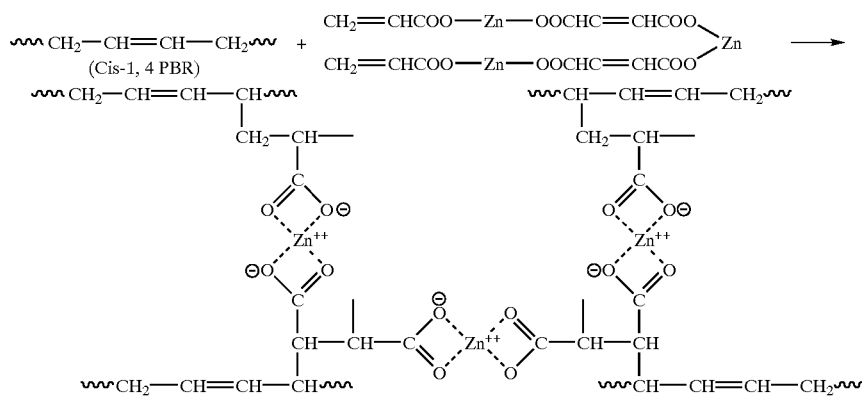

The abovementioned multifunctional metallic salt of unsaturated carboxylic acid is obtained from the reactant by using one kind of acrylic acid as a mono-basic acid, one kind of maleic acid as a di-basic acid and one kind of zinc oxide as a metal oxide. Meanwhile, as an other example, a multifunctional metallic salt of unsaturated carboxylic acid from the reactant by using two kinds of mono-basic acid, one kind of di-basic acid and one kind of metal oxide is as follows.

The crosslinking reaction of cis-1,4 polybutadiene and this multifunctional metallic coagent with an assistance of peroxide at 155~170° C. in a proper molding machine, the cured rubber having strong ionic bond which giving a superior tensile and tear strength in the same way as above. This cured rubber having strong ionic bond is represented in a chemical formula as follows.

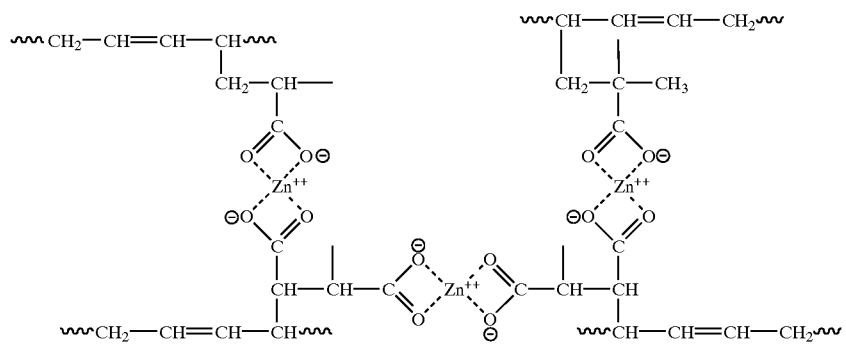

The reactant by using one mol of acrylic acid and one mol of methacrylic acid as a mono-basic acid, two mols of maleic acid as a di-basic acid and three mols of zinc oxide as a metal oxide, that can be generated trizincdimalemethacrylic-acrylate in a white powder. This reaction is represented in a formula as follows.

The used metal oxide of the abovementioned examples of reaction is only one kind of zinc oxide. But, if making a multifunctional metallic salt of unsaturated carboxylic acid by using two mols of zinc oxide and one mol of magnesium oxide, that is, two kinds of metal oxide, and the unsaturated carboxylic acid which comprises two mols of acrylic acid as a mono-basic acid and two mols of maleic acid as a di-basic acid, that can be generated monomagnesiumdimalezincdiacrylate in a form of white powder. This formula is as follows.

2 CH$_2$=CHCOOH + 2 HOOC—CH=CH—COOH + 2 ZnO + MgO ⟶

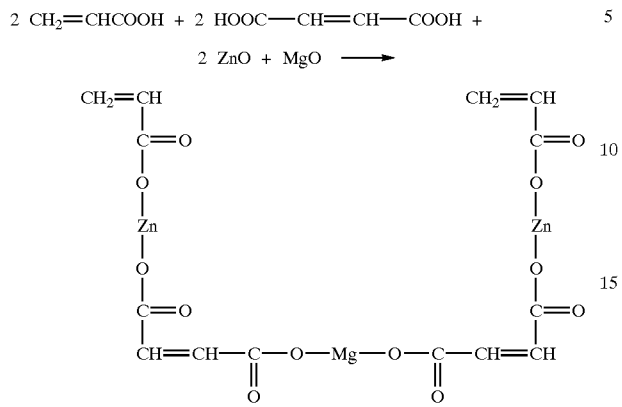

When this multifunctional metallic salt of unsaturated carboxylic acid crosslinks to cis-1,4 polybutadiene with an assistance of peroxide, the cured rubber also having the structure of strong ionic bond that giving a good property.

Meanwhile, the organic solvent which is used in time of making of the abovementioned multifunctional metallic coagent, that should be easily control the generated heat due to a violent exothermic reaction when reacting a metal oxide and an unsaturated carboxylic acid, having an hydroxyl radical in the structure is proper to this invention. Generally, in a reaction of an unsaturated carboxylic acid and a metal oxide, the excessive reaction, in other words, the reaction is not steady and consecutive that cause the reacting heat is generated in a state of uncontrollable, that easily making an ester oligomer and regenerating a metal oxide by the aid of small amount of oxygen in the firstly mixed air. This generated ester oligomer is an oily matter and having a sticky character, that is difficult to dry the generated water and to extract the organic solvent of reaction system. Moreover, the ester oligomer mixed with the metal oxide is difficult to blend with a rubber in milling operation due to a sticky state, and could not to increase a crosslinking density and hardness of the cured rubber, that is not qualify to be a crosslinker, only acting as a filler. In a reaction of an unsaturated carboxylic acid and a metal oxide of the present invention, the ester oligomer is generated if the temperature failed to control. Therefore, when making a multifunctional metallic coagent, it is important to select a proper organic solvent in accordance with the kind of an unsaturated carboxylic acid and the metal oxide. In other words, organic solvent must be easily absorbing the reaction heat, small amount of ester oligomer and the generated water in organic solvent. Especially, ethanol and isopropanol are proper solvent to solve the problems, occasionally small amount of an inorganic adsorbent like zeolite can be used. This inorganic adsorbent assists to absorb rapidly the generated water and small amount of ester oligomer. For an example, the generation of said ester oligomer is simply represented in a reaction formula as follows.

X {2 CH$_2$=CHCOOH + 2 HOOC—CH=CH—COOH + 3 ZnO} ⟶

-continued

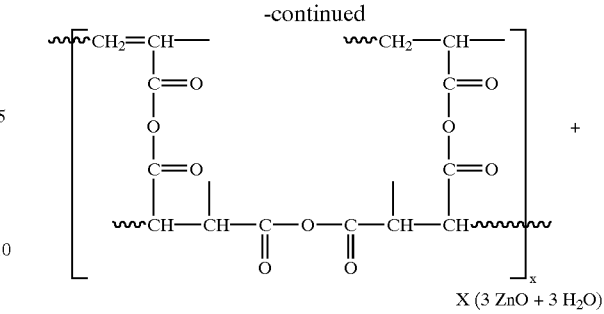

X (3 ZnO + 3 H$_2$O)

X = 2~3

This reaction of an unsaturated carboxylic acid and metal oxide as showing above, when receiving the excess heat directly which occurred by an unsteady reaction and partially reaction, then the phenomena became more seriously. Accordingly, selecting a proper solvent and raising the efficiency of heat exchanger and mixer for transmitting a reactive heat, the reaction of chemicals in this invention is operated. In order to make the multifunctional metallic salt of unsaturated carboxylic acid according to the present invention, as an example of the method is as follows. Firstly, put the said organic solvent into a reactor which has a stirrer for mixing the chemicals and with a jacket for exchanging the heat, and adding two mols of di-basic acid while stirring at a speed of 100~200 r.p.m., completely dissolving the acid. And, put two mols of mono-basic acid into the solution maintaining the speed of stirrer until the chemicals being dissolved completely, then, three mols of the said metal oxide is added little by little for 20~30 min. From this time, a lot of heat is generated by the exothermic reaction, rapidly cooling the jacket for exchanging the heat. Maintaining the temperature of reacting solution below 40° C., stirring the solution in about 60 min., then, the thick paste state of multifunctional metallic salt of unsaturated carboxylic acid is made in a form of dispersion in the said organic solvent. After that time, the temperature begin to drop, the reaction comes to an end point.

This thick paste state of reactant in a form of dispersion in the organic solvent that pour into a dryer, equipped a screw type agitator, condenser and pressure reducer, by using a proper pump. And, drying the reactant while agitating in a state of reduced pressure, then the used organic solvent and the generated water are eliminated. And after, grinding the results by using a proper milling machine such as pin mill and ball mill, the multifunctional metallic salt of unsaturated carboxylic acid in a white powder is obtained. Meanwhile, the condensed organic solvent that is contained an amount of water, which can be reused by a proper separation method.

EXAMPLES 1–4 AND COMPARATIVE EXAMPLES 1–3

As an example, the compositions of making the multifunctional metallic salt of unsaturated carboxylic acid and the nomenclature of obtained chemicals are indicated in Table-1. All numerical values represented the weight parts. And in order to prove the characteristics of cured rubber by the obtained coagents, made the cores of golf balls, and as a comparative example, the cores of golf balls are made by crosslinking the rubber with a commercial di-, tri-functional coagent in the market, the comparative data is indicated in Table-2. The cores of golf balls of the examples and comparative examples in here, all the diameter of cores are 39.4 mm, and the weight is adjusted by 37.1~37.3 gr.

The compositions of examples and comparative examples represented the weight parts. The coagents according to the present invention, in the compositions of Table-2 which are indicated as a represented abbreviation of the chemical nomenclature of the example 1~4, in Table-1.

TABLE 1

|  | Example | | | |
|---|---|---|---|---|
|  | 1 | 2 | 3 | 4 |
| COMPOSITION for COAGENT | | | | |
| Acrylic acid | 144 | 72 | 144 | 144 |
| Methacrylic acid |  | 86 |  |  |
| Maleic acid | 233 | 233 |  | 233 |
| Fumaric acid |  |  | 233 |  |
| Zinc oxide | 244 | 244 |  | 163 |
| Calcium oxide |  |  | 168 |  |
| Magnesium oxide |  |  |  | 41 |
| Zeolite |  |  | 15 | 15 |
| ORGANIC SOLVENT | | | | |
| Methyl alcohol |  |  | 350 |  |
| Ethyl alcohol | 750 |  |  |  |
| Isopropyl alcohol |  | 750 |  | 750 |
| Toluene |  |  | 400 |  |

Chemical Nomenclature
Example 1-----Trizincdimaleicacrylate (abbreviation:TZDMA)
Example 2-----Trizincdimalemonomethacrylicacrylate (abbreviation:TZDMMMAA)
Example 3-----Tricalciumdifumaricacrylate (abbreviation:TCDFA)
Example 4-----Monomagnesiumdimaledizincdiacrylate (abbreviation:MMDMDZDA)

TABLE 2

|  | Example | | | | Comparative Example | | |
|---|---|---|---|---|---|---|---|
|  | 1 | 2 | 3 | 4 | 1 | 2 | 3 |
| COMPOSITION of CORE | | | | | | | |
| Cis-1,4 polybutadiene rubber | 100 | 100 | 100 | 100 | 100 | 100 | 100 |
| 2,2'-methylenebis(4-ethyl-6-tert.-butylphenol) | 0.5 | 0.5 | 0.5 | 0.5 | 0.5 | 0.5 | 0.5 |
| Zinc oxide | 17 | 17.5 | 17 | 17 | 17 | 18 | 17 |
| TZDMA | 32 |  |  |  |  |  |  |
| TZDMMMAA |  | 32 |  |  |  |  |  |
| TCDFA |  |  | 33 |  |  |  |  |
| MMDMDZDA |  |  |  | 32 |  |  |  |
| SR416(1*) |  |  |  |  | 32 | 28 | 16 |
| SR638(2*) |  |  |  |  |  |  | 16 |
| SR350(3*) |  |  |  |  |  | 6 |  |
| Dicumyl peroxide (40%) | 3 | 3 | 3 | 3 | 3 | 3 | 3 |
| PROPERTY | | | | | | | |
| ATTI compression(4*) | 85 | 81 | 82 | 86 | 80 | 78 | 82 |
| Core surface Hardness (Shore-D)(5*) | 47 | 45 | 45 | 47 | 44 | 42 | 44 |
| Coefficient of restitution (C.O.R.)(6*) | 0.785 | 0.782 | 0.783 | 0.787 | 0.776 | 0.774 | 0.778 |
| Durability(7*) | ⊙~o | ⊙ | o | ⊙~o | o | o~Δ | o |

(1*)SR416
Brand name of zincdiacrylate which is a kind of di-functional metallic coagent of unsaturated carboxylic acid produced from Sartomer Co., Inc. U.S.A..
(2*)SR638
Brand name of zincdiacrylate which is a kind of di-functional metallic coagent of unsaturated carboxylic acid produced from Sartomer Co., Inc. U.S.A..
(3*)SR350
Brand name of trimethylolpropanetrimethacrylate which is a kind of tri-functional coagent in a form of liquid of unsaturated carboxylic acid produced from Sartomer Co., Inc. U.S.A..
(4*)ATTI COMPRESSION
Numeric values obtained by a test with a compression tester made by ATTI Co., in U.S.A., showing a compression strength of the golf balls that the higher valued one is relatively harder.
(5*)Core surface Hardness (Shore-D)
Test method of German Industrial Standard DIN 53505 with a hardness-measuring instrument made by Zwick Co. in Germany, measuring a hardness of core surface of the golf balls, that the higher valued one is relatively with a high hardness.
(6*)Coefficient of restitution (C.O.R.)
Measuring the rate of the outgoing velocity to the incoming velocity which measured by shooting a core of golf ball at a speed of 125 ft/sec. against a front vertical steel plate using an air-cannon shooting machine made by K-Lin Specialties, Inc., the velocity is measured by using a photo-sensor. If the outgoing velocity from the air-cannon is 1, and the incoming repulsive velocity by hitting against the steel plate is 0.77, then the coefficient of restitution can be calculated 0.77.
(7*)Durability
Measuring the injured degree of a core of golf ball by shooting 50 times at an air pressure of 1.6 Kg/Cm$^2$ to a front fixed steel plate which has grooves at intervals of 2 mm that using an air-cannon same as notice 6*, that is represented as
⊙ The surface of the core was somewhat scratched.
o The surface of the core was heavily scratched partially, and a harsh one.
Δ The surface of the core was seriously damaged.
x The core was broken.

EFFECT OF THE INVENTION

As the indicated data of Table-2, the cured rubber by using a multifunctional metallic salt of unsaturated carboxylic acid according to this invention, that increasing the hardness easier than the cured rubber by using a common coagent in the market, and having a good durability and a superior repulsive elasticity.

What is claimed is:

1. A non-aqueous multifunctional coagent of the metallic salt of unsaturated carboxylic acid made by a non-polymeric reaction in an organic solvent from two mols of mono-basic acid and two mols of dibasic acid as an unsaturated carboxylic acid, and three mols of divalent metal oxide.

2. The multifunctional coagent of the metallic salt of unsaturated carboxylic acid of claim 1, wherein the mono-basic acid of unsaturated carboxylic acid is selected from the group consisting of acrylic acid, methacrylic acid, and combinations thereof.

3. The multifunctional coagent of the metallic salt of unsaturated carboxylic acid of claim 1, wherein the di-basic acid of unsaturated carboxylic acid is selected from the group consisting of maleic acid, fumaric acid, and combinations thereof.

4. The multifunctional coagent of the metallic salt of unsaturated carboxylic acid of claim 1, wherein the divalent metal oxide is selected from the group consisting of zinc oxide, magnesium oxide, calcium oxide and combinations thereof.

5. The multifunctional coagent of the metallic salt of unsaturated carboxylic acid of claim 1, wherein an organic solvent is used for the reaction of the multifunctional coagent of the metallic salt of unsaturated carboxylic acid, said organic solvent being selected from the group consisting of methanol, ethanol, toluene, isopropanol, and combinations thereof.

6. A rubber product cured by crosslinking with the multifunctional coagent of the metallic salt of unsaturated carboxylic acid according to any one of claims 1–5.

7. The rubber product of claim 6, wherein the rubber is selected from the group consisting of polybutadiene rubber, balata rubber, polystyrenebutadiene rubber, polyethylenebutadiene rubber, polyisoprene rubber, chlorinated rubber, silicone rubber, and combinations thereof.

* * * * *